March 3, 1970  G. W. NICHOLS  3,498,723

MOVIE CAMERA EXPOSURE INTEGRATOR

Filed Aug. 29, 1967

INVENTOR.
Gordon W. Nichols
BY
Edward H. Loveman
ATTORNEY

United States Patent Office 3,498,723
Patented Mar. 3, 1970

3,498,723
MOVIE CAMERA EXPOSURE INTEGRATOR
Gordon W. Nichols, Binghamton, N.Y., assignor to GAF Corporation, New York, N.Y., a corporation of Delaware
Filed Aug. 29, 1967, Ser. No. 664,097
Int. Cl. G01j 1/46, 1/36; G01p 3/40
U.S. Cl. 356—215
12 Claims

ABSTRACT OF THE DISCLOSURE

The invention relates to apparatus for determining the quantity of light available at the focal plane of a camera for a particular shutter opening. A fibre optics assembly is placed in the film position of a camera and light appearing at each shutter opening is conducted to a photomultiplier. The photomultiplier output is integrated for a predetermined number of shutter openings to determine the total light input to the camera.

---

Figure 1:
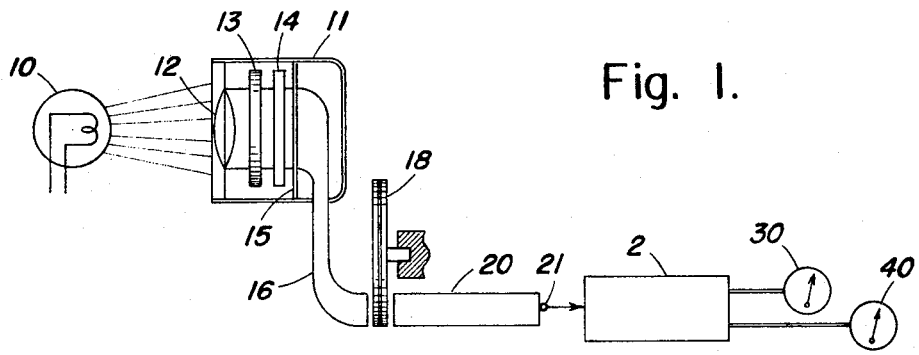

The present invention relates to a test apparatus to test the accuracy of automatic exposure control settings of cameras, and more particularly to apparatus which rapidly and efficiently provides a meter indication of the accuracy of setting and sensitivity of an automatic exposure control of a camera.

In any camera, the amount of light received by a film for a given frame is dependent on the time the shutter is open, the aperture opening of the lens, and the light intensity to which the camera is exposed. Generally, fully automatic cameras contain built in exposure mechanisms which are operated by photocells to adjust the shutter opening in proportion to the light sensed by the photocell. In the manufacture of this type of camera, it is essential, at some point, to determine the accuracy of this mechanism. Many and various types of apparatus have been used successfully in making this determination for still cameras, however, because of the obvious difficulties in determining the quantity of light admitted in a single frame of an automatic movie camera, it has been the practice in cameras of this type to merely shoot a length of film and then compare the resultant exposed film with a standard. This method is obviously very time consuming, expensive and not very accurate.

Now, in accordance with the present invention the accuracy of an automatic exposure control may be determined by exposing the camera to a light source of predetermined intensity. The amount of light passed by the camera diaphragm, for each shutter opening, may be conducted by means of fibre optics to a photomultiplier tube, from which an electrical signal is derived, which depends on the amount of light striking the fibre optics. At this point, the signal is divided and one part of the electrical signal is integrated to obtain an output of total light striking the fibre optics, and hence the photomultiplier tube, over a number of frames. The other part of the signal is used to control a counter which counts a predetermined number of frames. After the predetermined number, for example, 16 frames has been reached, the integrator is reset so that a new value is obtained for a new number of frames.

Since the photomultiplier has a limited linear range of operation, a wheel having a variable density filter is interposed between the output of the fibre optics and the cathode of the photomultiplier tube. This wheel is adjusted so that the photomultiplier tube will operate within its linear range when a standard camera, of known quality, is on the test stand. Deviations of performance of cameras to be tested can then be read on a meter. Should the meter go off scale, that is, should the camera to be tested later be sufficiently mis-adjusted to exceed the range of the photomultiplier tube, then the variable density of filter can again be readjusted and a value of additional correction to be undertaken obtained from the extent of change of attenuation of light by this filter.

Additionally, the instrument can be used to monitor the operation of electric eye automatic diaphragms, or aperture controls, on movie cameras at various film speeds (frames per second) and over a range of lighting conditions. In addition to the meter which may provide a reading of integrated light, over the predetermined number of frames, or the light over one frame, a separate meter may be provided for direct reading of frames per second. The pulses obtained from the photomultiplier tube, independent of their intensity, or absolute value, can be utilized to provide output for such a counting meter, for example, by first converting the pulses in a frequency-analogue converter to an analogue-voltage.

One of the prime objects of this invention is to provide an apparatus which will accurately measure the quantity of light admitted to the focal plane of a camera.

Another object of the invention is to provide apparatus which will automatically indicate the amount of light admitted to the focal plane of a movie camera during one frame.

Still another object of the invention is to provide apparatus which will permit operation of a photomultiplier tube only within its limited linear range despite wide changes in light input.

Figure 2:
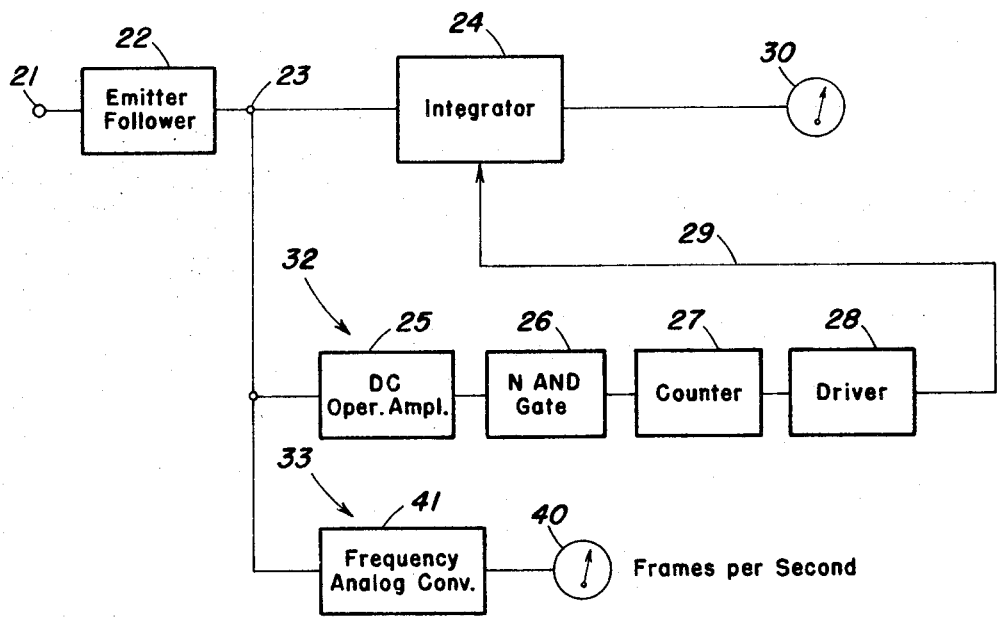

These and other objects and many of the attendant advantages of this invention will be readily appreciated as the same becomes better understood by reference to the following detailed description when considered in connection with the accompanying drawings in which:

FIG. 1 is a schematic representation of the test arrangement in accordance with the present invention, and FIG. 2 is a schematic electrical block diagram of the circuit included in the test arrangement of FIG. 1.

Referring now to the drawings, wherein like reference characters designate like or corresponding parts throughout the several views, FIG. 1 illustrates a light source 10 of known intensity to provide a region of diffuse light, which strikes an objective 12 of a camera 11. Located behind the objective 12 is an aperture, or diaphragm, schematically indicated at 13, and a shutter mechanism 14; the film plane is indicated at 15. The drive mechanism, pull-down arrangement and all other parts of the camera not necessary for an understanding of the present invention have been omitted.

During test, a fibre optic assembly schematically indicated at 16 is arranged within the camera and located to have one end at the film plane 15. The other end of fibre optic assembly 16 is located to be in light transmissive relation to a conventional photomultiplier tube 20. As is well known in the art a photomultiplier tube has only a limited range of linear operation. Therefore, inserted in the path of light between fibre optic 16 and photomultiplier tube 20 is a disc 18, rotatably mounted on a stationary part of the test apparatus which may be adjusted by the test operator to maintain the operation of the photomultiplier in the linear range as will be more specifically described below. The disc 18 comprises a circular variable density filter material cemented between sheets of glass or laminated in acetate. The variable density filter material may be of the type, for example, manufactured by Eastman Kodak and designated as M-Type Carbon and Wratten No. 96 Density.

The output of photomultiplier 20, appearing at a terminal 21 is conducted to a circuit generally designated as reference numeral 2, which will be explained in greater detail below. A first meter 30 may be calibrated to read integrated light output over a predetermined number of frames (or for one frame) at a particular f-stop opening and for a particular intensity of the light source 10. A second meter 40 may be provided to read directly the frames per second.

In the circuit 2, as shown in detail in FIG. 2, a terminal 21 of the photomultiplier tube 20 is connected to a conventional emitter follower circuit 22, the output of which is coupled to a terminal 23. The output at terminal 23 is applied to an integrator 24, which preferably is an operational amplifier having a capacitor network in its feedback path. The output of the integrator 23 is applied to the meter 30.

Junction 23 is likewise connected to a counter circuit generally designated by reference numeral 32, which includes an operational amplifier 25 functioning as a pulse-shaper to removing differences in output amplitude from the signal derived from junction 23. The output of the amplifier 25 is applied to a conventional NAND gate 26, and then to a counter 27 which counts a predetermined number of frames, that is pulses, received from operational amplifier 25 and gate 26. A suitable count may be, for example, 16 frames. The counter 27, which is preferably a flip-flop chain in the form of a frequency divider, is connected to a driver 28, which is connected over a reset line 29 back to the integrator 24. When the counter 27 has counted 16 frames, driver 28 causes the integrator 24 to reset itself to zero, for example, by placing a short circuit across the output thereof.

Junction 23 is further connected to a frequency-analogue circuit generally designated as reference numeral 33 and includes a conventional frequency analogue convertor 41, which counts the pulses received from the emitter follower 22 and provides an analogue voltage, over a unit time. The output from convertor 41 is indicated on the meter 40, which may indicate frames per unit time, for example, frames per second. The analogue-to-frequency convertor, schematically indicated at 41, may have any form well known in the art and be, for example, a standard tachometer. Moreover, rather than being connected to junction 23, convertor 41 may receive its input from the outputs of either operational amplifier 25 or NAND gate 26.

During typical production testing use, an electric eye camera of known quality is placed in operation on a standard optical bench facing the diffused light source 10. The variable density disc 18 is then adjusted manually to a position which causes the output meter 30 to reach center-scale. After this initial setup, any number of cameras to be tested consecutively are placed in the test position instead of the standard camera, and the exposure difference, if any, can be noted from the meter. If the reading is off scale, the variable density disc 18 may be rotated by the operator to bring the meter back to center scale. The circumference of disc 18 preferably has a dial, calibrated in one-half f-stops, so that the error can be read from the calibrated dial, if it is large, as well as from the meter, if the meter error is within scale. Use of the fibre optic assembly 16 readily adapts the apparatus to the testing of various models of camera, of various sizes, and permits use of commercially available standard transducer and circuit eletments without requiring the construction of special units which fit into the constricted space within, for example, 8 mm. movie picture cameras. Integrator 24 will integrate the light over a predetermined number of frames, giving an output indication on the meter 30, independently of the particular individual frames/seconds speed of the camera, or the shutter configuration of the particular model of the camera. The light integrated is directly proportional to the amount of exposure a film in the camera would actually receive.

The various circuit elements referred to in the specification, and illustrated in block diagram form in FIG. 2 are commercially available as such and illustrated and described in various handbooks on electronic components such as the Computer Handbook by Huskey and Korn and the G.E. Transistor Handbook.

It should also be understood that the foregoing relates to only a preferred embodiment of the invention, and that it is intended to cover all changes and modifications of the example of the invention herein chosen for the purposes of the disclosure, which do not constitute departures from the spirit and scope of the invention.

What is claimed is:

1. A method of testing the accuracy of automatic exposure controls for a movie picture camera comprising:
    exposing the camera objective and the camera exposure control arrangement to a light source of predetermined intensity;
    detecting the amount of light passed by the camera diaphragm for each shutter opening, corresponding to a motion picture frame;
    deriving an electrical signal representative of said amount of light;
    deriving an electrical pulse for each shutter opening and counting a predetermined number of said pulses;
    integrating said electrical signal corresponding to a predetermined number of shutter openings;
    indicating said integrated value; and
    deriving a reset signal at the end of said predetermined number of shutter openings, and applying said reset signal to terminate the step of integration, to enable integration over a subsequent cycle of testing thereby to include a subsequent integration step.

2. The method as recited in claim 1 including the step of indicating said predetermined number of frames with respect to a time base.

3. The method as recited in claim 1 wherein the step of detecting the amount of light passed by the camera diaphragm includes the step of guiding said light from a position equivalent to the film plane of the camera to an optical-electrical transducer.

4. The method as recited in claim 1 including the step of attenuating the light passed by said diaphragm.

5. Apparatus for testing the accuracy of an automatic exposure control arrangement in a camera comprising:
    a light source;
    light responsive means located to receive light passing the objective of said camera and providing an electrical signal representative of said light;
    counter means responsive to the occurrence of said electrical signal and providing a count for each shutter opening;
    an integrator circuit responsive to said electrical signal and providing an integrated output representative of said signals;
    indicator means indicating said integrated output; and
    means responsive to a predetermined count of said counter means connected to said integrator to reset said integrator and start a new integration cycle.

6. Apparatus as recited in claim 5 wherein said light responsive means includes a fibre optics assembly having one end located at the film plane of said camera; and an optical-electrical transducer located to receive light from the other end of said fibre optic.

7. Apparatus as recited in claim 5 wherein said light responsive means includes a photomultiplier tube.

8. Apparatus as recited in claim 7 wherein said counter means includes a pulse responsive and wave-shaping circuit connected to said photomultiplier tube and a counter chain, preset for a predetermined count, and coupled to said pulse responsive and wave-shaping circuit to provide a signal at said predetermined count which is applied to said integrator means to reset the same.

9. Apparatus as recited in claim 5 wherein said integrator means in an operational amplifier and said counter means provides a signal applied to said operational amplifier to disable said operational amplifier and thereby start a new integration cycle.

10. Apparatus as recited in claim 5 including a variable density filter means insertable in the light path from said light source to said light responsive means.

11. Apparatus as recited in claim 10 wherein said light path includes a fibre optics assembly terminating in advance of said light responsive means, and said variable density filter means are inserted between said fibre optics assembly and said light responsive means.

12. Apparatus as recited in claim 10 wherein said variable density filter means is a variable density circular disc.

References Cited

UNITED STATES PATENTS

| | | | |
|---|---|---|---|
| 2,017,653 | 10/1935 | Clarke et al. | 356—25 X |
| 2,296,676 | 9/1942 | Kearsley | 356—25 X |
| 2,688,897 | 9/1954 | Palm | 73—5 X |
| 3,229,497 | 1/1966 | Goldfarb | 73—5 |

OTHER REFERENCES

D'Agostino: "Photometric Calibration of Automatic Exposure Control Systems," U.S. Army Tech. Rept. Ecom-2748, August 1966, title and index pages and pp. 1–11.

RONALD L. WIBERT, Primary Examiner

R. J. WEBSTER, Assistant Examiner

U.S. Cl. X.R.

73—5; 356—25, 217

Disclaimer 3,498,723.—*Gordon W. Nichols,* Binghamton, N.Y. MOVIE CAMERA EXPOSURE INTEGRATOR. Patent dated Mar. 3, 1970. Disclaimer filed Sept. 30, 1982, by the assignee, *Eastman Kodak Co.*

Hereby enters this disclaimer to all claims of said patent.

[*Official Gazette February 8, 1983.*]